Aug. 15, 1967  G. P. ROBINSON, JR  3,335,939
RESEALABLE PACKAGE CLOSURE
Filed Dec. 27, 1965
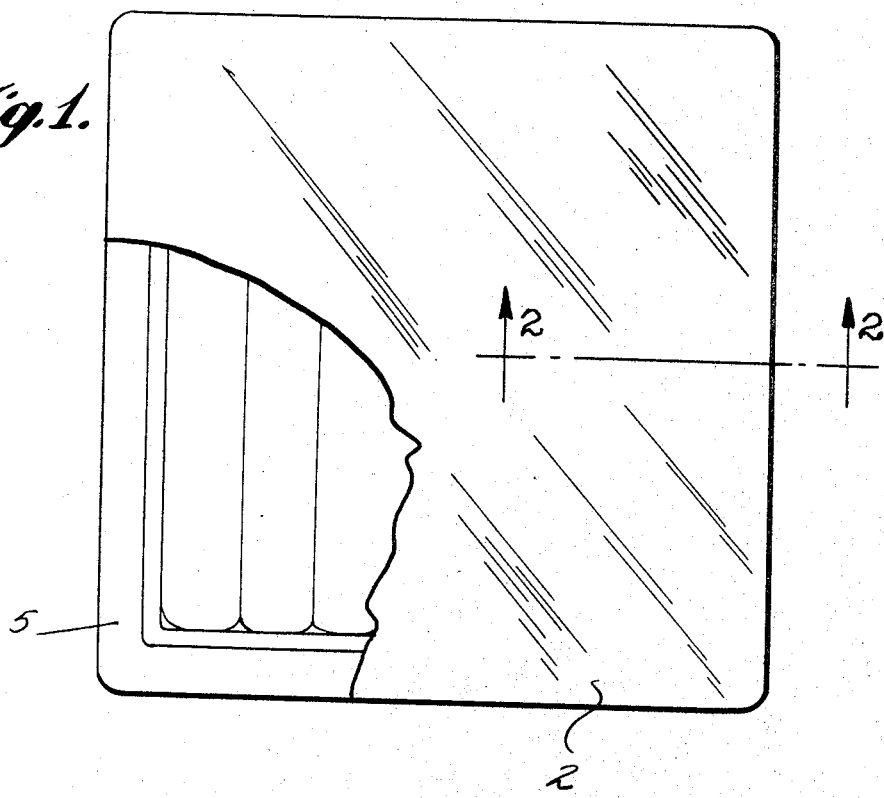
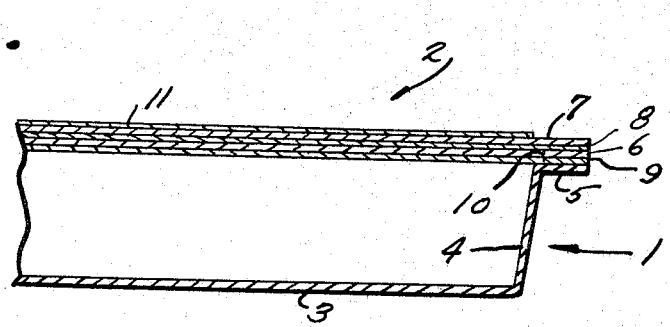
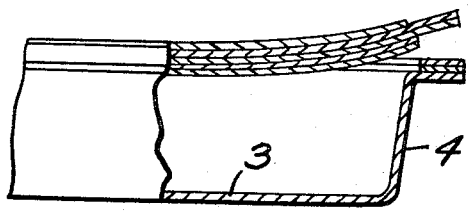
INVENTOR
GLEN P. ROBINSON, JR.
BY Cushman, Darby & Cushman
ATTORNEYS United States Patent Office 3,335,939
Patented Aug. 15, 1967

3,335,939
RESEALABLE PACKAGE CLOSURE
Glen P. Robinson, Jr., Atlanta, Ga., assignor to Scientific-Atlanta, Inc., Atlanta, Ga., a corporation of Georgia
Filed Dec. 27, 1965, Ser. No. 516,497
2 Claims. (Cl. 229—43)

ABSTRACT OF THE DISCLOSURE

A package comprising a receptacle and an openable and reclosable laminated closure. The closure comprises an inner layer of imperforate aluminum foil permanently sealed to the receptacle and an outer layer held to the inner layer by pressure sensitive adhesive. To open the package, the foil is torn by stripping the outer layer from the foil layer in the region of the permanently sealed portion while the other portions of the foil remain adhered to the outer layer.

---

The present invention relates to a package and more particularly to a package having a closure which may be opened and reclosed repeatedly by pressure sensitive adhesive. In its preferred form, the package comprises a cup having an open side and a lid which seals against that open side by pressure sensitive adhesive.

Economical packaging of mass produced articles and commodities requires the use of automatic packaging machinery, preferably machinery which automatically places the goods in the package and closes it. Pressure sensitive adhesive closures ordinarily are not useful in such machinery because of the ease with which such adhesive sticks to most articles. For example, in the preferred type of package referred to above, packaging machinery may require a lid feeding mechanism which withdraws lids from a stack and places them on packages. In this type of system, pressure sensitive adhesive on the lids is inconvenient because of the difficulty of separating individual lids from the stack. Therefore, the most common type of seal for this type of package is a heat seal, that is a seal formed e.g. by placing a closure in contact with a receptacle and heating. A seal is formed by softening and then rehardening a thermoplastic material such as polyethylene or by using a heat activatable adhesive. Seals of this type are broken when the package is opened and are not reclosable. Efforts have been made to develop materials which become pressure sensitive adhesive when heated, but these have not yet removed the need for a commercially workable pressure sensitive adhesive closure system.

The present invention provides a kind of masked or concealed pressure sensitive adhesive which is covered during the packaging operation but which is usable by the purchaser for repeated opening and closing of the package. Briefly stated, the closure member is a laminate of a paper or other layer with a metal foil layer. The paper layer is adhered by pressure sensitive adhesive to one side of the metal foil layer and the other side of the metal foil layer is permanently sealable to a receptacle. In one embodiment it is coated with a material which is capable of heat sealing to a receptacle.

One important advantage of this package is that it makes effective use of paper-foil laminated lid. It is known to use paper-foil laminates to provide a combination of an effective gas barrier and easy printing for labeling purposes. Metal foil is an especially good packaging material for perishable commodites which are packaged under vacuum or with an inert gas, because it prevents entry of, for example, oxygen from the atmosphere. There have been some proposals to package fresh meat and vegetables in oxygen, in which case the metal foil would prevent escape of the oxygen. This type of closure also prevents escape of flavor, oils and moisture where necessary. However, metal foil has the disadvantage that it is more expensive than, say, paper, is easily punctured and it is more difficult to print than paper. Therefore, paper-foil laminates have been developed which permit reducing the thickness of the foil and therefore its cost while providing a printable surface.

The preferred form of package is illustrated in the drawing, in which

FIG. 1 is a plan view of a package for wieners with a portion of the lid removed to show the contents;

FIG. 2 is a partial cross-section along line 2—2 of FIG. 1; and

FIG. 3 is a view similar to FIG. 2 showing the lid of the package opened.

The package shown in the drawing comprises a cup and a lid indicated generally by the numbers 1 and 2 respectively. The cup has a bottom 3, sides 4 and a flat horizontal flange 5 extending continuously around the package from the tops of the sides 4. The cup may be constructed of a transparent plastic material such as polystyrene or polyvinyl chloride having sufficient thickness to be relatively rigid, e.g. 15–20 mils. However, it also may be made of other relatively stiff or rigid materials such as cardboard or aluminum foil.

The upper side of the flange is heat sealable to the lid. Therefore, if the cup is not itself composed of a heat sealable material, it may be necessary to provide a heat seal coating, depending on the nature of any heat seal coating on the underside of the lid. In some cases, a coating on the flange may be continued into the interior of the cup as a barrier layer.

The lid 2 in the embodiment shown is flat and has about the same outer dimensions as the cup, or may be provided with a tab at one corner to facilitate lifting. It is a laminate of a lower, inner layer 6 of metal foil and an outer layer 7 of paper or some other material.

The term metal foil means a sheet of metal which is sufficiently thick to function as a gas barrier and to be self-supporting. The actual thickness will depend on the tensile strength and other properties of the metal used, but typically it will be at least 0.5 mil thick. The thickness ordinarily will be no more than necessary, for reasons of economy, and also to make it easy to tear an inner portion or area from an outer permanently sealed area when opening the package. For example, aluminum foil preferably is no more than about 0.8 mil thick.

Almost any metal may be used, such as steel, brass, copper, tin and other pure metals and alloys. However, aluminum foil is especially suitable.

The paper or board layer 7 also must be sufficiently thick to be self-supporting and may be for example 5 to 10 mils thick.

A pressure sensitive adhesive layer 8 is placed between the paper and metal foil layers, ordinarily as a coating on the paper layer. Pressure sensitive adhesives are tacky substances which stick readily to surfaces and can be removed cleanly from non-fibrous surfaces without delamination onto the surface. They are widely used on transparent and other tapes supplied in roll form for decorative sheet materials such as wallpaper, and otherwise where easy sticking and/or easy removal is desirable.

Numerous compositions are known to be useful as pressure sensitive adhesives having a wide variety of properties. In principle any composition of this type may be used in practicing the present invention, although some may be preferred for particular applications. For example, when the package will be heat sealed to the receptacle, consideration may have to be given to the effect of heat on the pressure sensitive adhesive. Similarly, if the package will be stored in a freezer, the pressure sensitive adhesive will have to be one which does not become brittle and non-adhesive at low temperatures.

Generally speaking pressure sensitive adhesive compositions are characterized by a higher degree of tackiness than other adhesives so that they bond almost instantaneously when slight contact pressure is applied to press the mating surfaces together. They also have high cohesive strength to prevent delamination on lifting from non-fibrous surfaces. These properties are balanced with elasticity and other desired properties by selection of components which ordinarily include rubber or some other film-forming elastomeric material, a gummy or resinous substance to increase tackiness and solvents. In some acrylic polymers the proper blend of properties is achieved in a single material. As will be appreciated, many compositions of this type are available commercially and others are described in the technical literature. Therefore, the selection of a pressure adhesive is within the skill of the art and forms no part of the present invention.

It is common that a pressure sensitive adhesive is used with a primer coating which permanently holds it to one of the two mating surfaces. It is contemplated that such a material may be used within the scope of the present invention, ordinarily between the pressure sensitive adhesive and the outer layer 7. Thus, when a purchaser opens the package, the pressure sensitive adhesive will lift cleanly from the inner metal foil layer 6. It also is possible to use a release coating on the foil, to further help in release of the pressure sensitive adhesive, but it ordinarily is not necessary.

As indicated above, it is preferred to have the pressure sensitive adhesive permanently bound to the outer layer 7. It may be made releasable from the outer layer 7 and permanently bound to the metal foil layer 6. However, this is less desirable, since it will leave a tacky substance on the receptacle 1 when the purchaser is removing the contents.

At least a portion of the lower side of the metal foil layer is "permanently" sealable to the receptacle 1. In the embodiment shown in the drawing, this is the portion which mates with the flange 5. Any type "permanent" seal may be used, i.e. any type of reasonably strong seal which is not easily released in the manner of a pressure sensitive adhesive. For example, an adhesive which is made active by moisture may be used. However, heat sealing is preferred because of the ease of using it in automatic packaging equipment.

The term heat seal refers to any kind of sealing which may be effected by application of heat. Generally speaking, there are two types of heat sealing which can be used, based on heat curable adhesives and thermoplastic substances which are softened on heating and rehardened on cooling. Numerous materials of both types are described in technical literature and are available commercially, their selection forming no part of the present invention.

The permanent adhesive is formed by means of a coating layer 9 between the foil layer 6 and the package, e.g. the flange 5. There may be an adhesive substance as an undercoating on the foil layer and another adhesive substance as a coating on the cup, if the cup is not composed of a heat sealable plastic. However, a coating on only one of the mating surfaces may be used if it can provide a satisfactory seal.

To facilitate opening of a package, it is preferred to score, perforate or otherwise provide a line of weakness 10 in the foil layer 6. This enables the portion of the foil layer which is permanently sealed to the cup to be torn easily from the rest of that layer when the package is opened; a circle of the foil layer remains adhered to the cup and the central portion of the foil layer lifts off with the lid 2. The choice of the weakness will depend on the intended use of the package. For example, perforations are most effective, but may reduce the gas barrier properties of the package. The foil also may be completely severed or cut to a shallow depth by a die cutter in a manner well known in the art of packaging.

For use, the lid also may be decorated by application of a layer of printing 11, as shown, by embossing or by other means.

It will be appreciated that the closure disclosed may be used with other types of packages, including bottles, cans and the like. Similarly, while paper or paperboard is a preferred material for the outer layer, for reasons of economy and ease of decoration, other materials may be used. Therefore, while preferred forms are disclosed, numerous changes may be made in details of construction, selection of materials and mode of operation without departing from the scope of the invention as defined in the appended claims.

I claim:
1. A package for goods comprising a receptacle and a closure member, said closure member having a continuous inner layer of imperforate aluminum foil up to about 0.8 mil thick and an outer layer, and pressure sensitive adhesive between said outer layer and one side of said metal foil layer, at least a portion of the other side of said metal foil layer being permanently sealed to said receptacle, said pressure sensitive adhesive being concealed during packaging operations by said foil but usable by a consumer for opening and reclosing the package, whereby said aluminum foil is torn by said consumer between said permanently sealed portion and other portions when the package is opened and said other portions of the foil remain adhered to said outer layer by said pressure sensitive adhesive, permitting access to the goods in said package.

2. A package as set forth in claim 1 in which said receptacle is a cup having a bottom, sides and a sealing flange extending laterally from the sides, and said closure is a lid which overlies and is permanently sealable to said flange.

References Cited
UNITED STATES PATENTS

| | | | |
|---|---|---|---|
| 2,063,999 | 12/1936 | Harrison | 229—45 |
| 2,271,279 | 1/1942 | Thomas | 229—80 |
| 2,719,663 | 10/1955 | Mayer-Jagenberg | 229—7 |
| 2,738,916 | 3/1956 | Peters | 229—7 |
| 2,878,128 | 3/1959 | Jorgenson | 99—192 |
| 3,049,224 | 8/1962 | Fredette et al. | 206—42 |
| 3,079,057 | 2/1963 | Colarusso | 229—3.5 |
| 3,202,271 | 8/1965 | Kirk | 206—56 |
| 3,272,422 | 9/1966 | Miller | 229—43 |

JOSEPH R. LECLAIR, Primary Examiner.

G. O. RALSTON, Assistant Examiner.